United States Patent Office 2,735,052
Patented Feb. 14, 1956

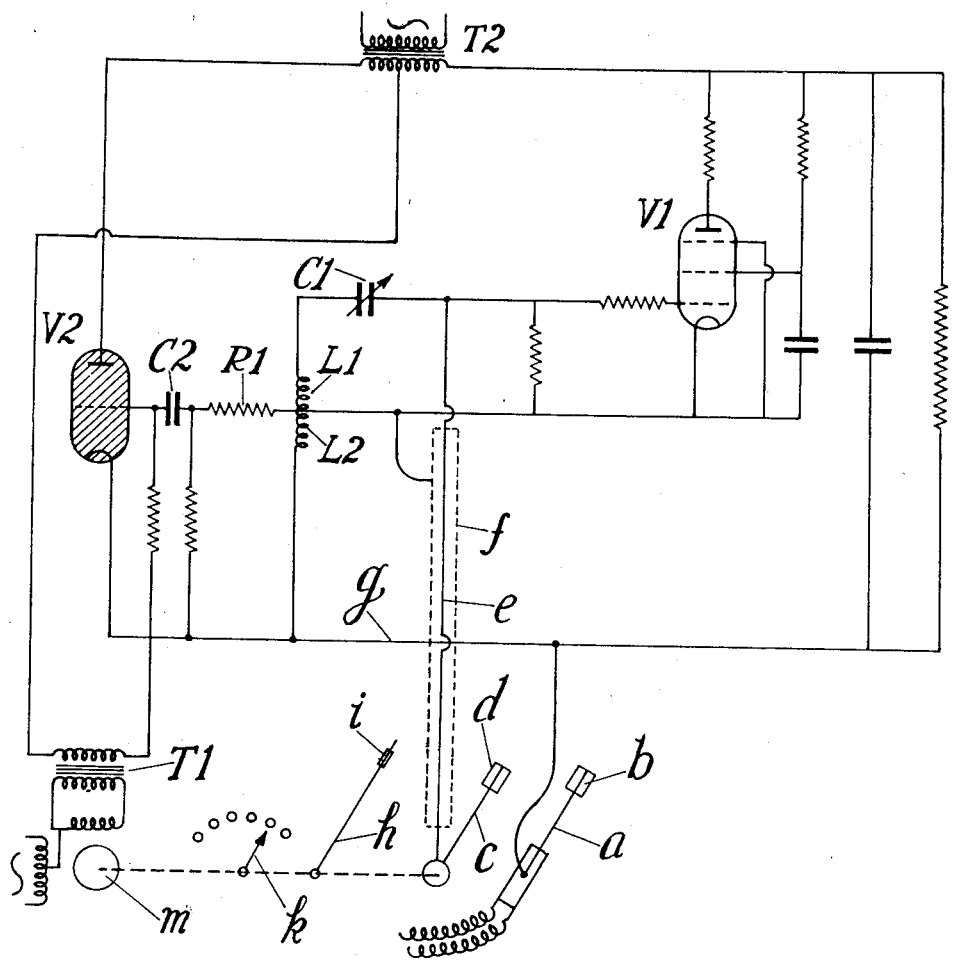

2,735,052

FOLLOW-UP CONTROL FOR INDICATOR

John Ernest Fielden, Wythenshawe, Manchester, England, assignor, by mesne assignments, to Robertshaw-Fulton Controls Company, Greensburg, Pa.

Application May 8, 1950, Serial No. 160,640

4 Claims. (Cl. 318—31)

This invention relates to recording and like apparatus and has for its object to provide improved means for recording or otherwise utilising the indications of an electrical measuring instrument or other meter having a moving pointer or the like.

According to the invention, I provide an arm mounted coaxially with the pointer, means for controlling an oscillatory circuit in accordance with the relative positions of the arm and the pointer, means for driving the arm and means for energising said driving means, controlled by the oscillatory circuit, whereby the arm is driven to bring it to a predetermined position relative to the pointer, and a recording pen and/or a control device is driven to the same extent.

Preferably use is made of a capacity-sensitive oscillatory circuit, and of a capacitative element such as a small vane carried by the arm, connected to the oscillatory circuit so that changes in the capacity of the element due to changes in the distance away of the pointer, will permit or suppress oscillation of the circuit. Then if the pointer moves away from the arm the self-capacity of the element on the arm is reduced and the circuit may be caused to oscillate, its changed condition being utilised to drive the arm to restore it to its predetermined position relative to the pointer.

The oscillatory circuit may be arranged to vary the bias of a thyratron when it begins or stops oscillating. The oscillator output may be rectified by the grid-cathode circuit of the thyratron, so that when oscillation occurs a negative charge accumulates on a grid condenser and the thyratron is prevented from firing at the next-half-cycle of the A. C. supplied to its anode, the thyratron current being used to control the driving means.

The driving means may comprise a reversible electric motor, suitably geared to the arm and the recording pen.

The accompanying explanatory drawing illustrates diagrammatically the circuit arrangement of one form of the apparatus according to the invention.

$a$ represents the pointer of moving coil instrument, to which is applied a voltage or current requiring to be recorded or corresponding to some other quantity which has to be recorded. The pointer carries a small metal vane $b$, and there is mounted coaxially with the pointer an arm $c$ carrying a metal vane $d$. The vane $d$ is connected by a screened conductor $e$ to one side of a variable condenser $C1$ and to the control grid of an oscillator valve $V1$.

An inductance $L1$ is connected between the other side of $C1$ and the cathode of $V1$, the screen $f$ also being connected to the cathode. A further inductance $L2$ is connected in series with $L1$, and to a conductor $g$, to which the vane $b$ also is connected.

The junction of $L1$ and $L2$ is connected through a resistance $R1$ and condenser $C2$ to the control grid of a thyratron $V2$, the cathode of which is connected to conductor $g$. Conductor $g$ is connected through the primary of a transformer $T1$ to a centre tap in the secondary of a power transformer $T2$, the primary of which is supplied with A. C. The two ends of the secondary of $T2$ are connected to the anodes of $V1$ and $V2$, whereby the valves are fed with A. C. in anti-phase.

The secondary of $T1$ feeds a reversible electric motor $m$, arranged to drive through suitable gearing, the arm $c$, and an arm $h$ carrying a recording pen $i$. It may also drive an arm $k$, which may for example move over contacts to actuate means for correcting variations in the quantity being measured.

The circuit of valve $V1$ constitutes a Hartley radio-frequency oscillator circuit and the condenser $C1$ together with the stray capacitance of the vane $d$ to form a high impedance radio frequency potential divider which determines the phase of the feed-back voltage of the oscillator. When $C1$ is greater than the vane capacitance the feed-back is positive and the valve will oscillate, and when $C1$ is less than the vane capacitance the feed-back is negative and no oscillation occurs. As the valve anodes are supplied with A. C. at say 50 cycles in antiphase, radio frequency oscillations can be produced only during alternate half cycles, and the valve $V1$ is able to conduct only during alternate half cycles of the A. C. supply when the valve $V2$ is not conducting.

The output of the oscillator is rectified by the grid-cathode circuit of the thyratron $V2$, acting as a diode, and consequently when oscillation occurs a negative charge accumulates on the grid condenser $C2$, whereby the thyratron is prevented from firing at the following half cycle. When oscillation is not occurring the negative charge can leak away and the thyratron can fire at successive positive half cycles.

The circuit is so adjusted that when the vanes $b$ and $d$ are a short distance such as one one-hundredth of an inch apart, the electrostatic attraction due to the voltage on the vane $d$ pulls the vane $b$ towards it. The small movement of the vane $b$ increases the capacity between the vanes and thereby causes the oscillator to cease oscillating so that the electrostatic attraction also ceases. The meter vane $b$ then returns to its position determined by the meter deflection, and the oscillator again generates oscillations and the electrostatic attraction is restored. Consequently the meter vane $b$ is kept oscillating while the vane $d$ remains substantially stationary, and in a normal case the amplitude of oscillation at the outer end of the vane is about a thousandth of an inch and the frequency is about two cycles per second. The fact that the meter movement is in oscillation overcomes any tendency for pivot sticking and enhances accuracy. The motor $m$ is arranged to drive the arm $c$ away from the pointer while there is no oscillation and the thyratron $V2$ is conducting, but as soon as the predetermined short distance between the vanes is exceeded, oscillation begins, the thyratron ceases to conduct and the anode current of $V1$ passes through the transformer $T1$ in opposite phase to the thyratron current and reverses the motor.

If the meter pointer is deflected from its initial position, the arm $c$ will follow it. If the pointer moves towards the arm, the thyratron fires and the motor continues to drive the arm away from the pointer until the latter reaches its new position. If desired, a stop may be provided on the arm or the pointer to prevent actual contact of the vanes. If the pointer moves away from the arm, oscillation occurs and the motor drives the arm to follow the pointer. As the valves have A. C. potentials applied to their plates, whichever valve is for the time being operative, will be operative only during one-half of each cycle of the A. C. but it continues to operate during alternate half-cycles as long as is necessary.

At the same time the motor drives the arm $h$ carrying the pen $i$, which moves over a chart mounted on a drum or disc, and if desired an arm $k$.

It will be clear that the output of the oscillator will vary with the capacitance between the vanes $b$ and $d$, and when the output is higher the charge will accumulate more rapidly on the grid of the thyratron during the half cycle in which the oscillator is oscillating. During the other half cycle in which the thyratron is capable of firing, the charge will decrease at a rate determined by the C2 capacitator constant, and when the oscillator output is less than that corresponding to full motor torque, the charge may drop below the firing point of the thyratron. The lower the output of the oscillator, the less is the charge, and the sooner in the half cycle is the thyratron allowed to fire. Conversely the higher the output, the longer is firing delayed. Consequently, there is a continuous range of net motor outputs corresponding to various relative positions of the vanes.

With the arrangement according to the invention, the indications of any meter are recorded without any additional load on the meter. For example, the indication of a low resistance milliameter can be accurately recorded without any more power being taken by the meter than is necessary to drive its moving coil.

What I claim is:

1. In apparatus for indicating movements of a mass, the combination comprising an oscillator, means for controlling oscillations in said oscillator including a capacitor comprising a movable electrode adjacent the mass and having an electrical capacitance relative thereto, said last named means being constructed and arranged to permit said oscillator to oscillate when said capacitance varies in one direction from a predetermined value and to suppress oscillations in said oscillator when said capacitance varies in another direction from said predetermined value, reversible motor means connected to said electrode for moving the same relative to said mass for varying said capacitance, means for energising said motor means for moving said electrode relative to said mass to increase said capacitance, means for energising said motor means for moving said electrode relative to said mass to decrease said capacitance, and circuit means connecting said oscillator and said energising means for rendering one of said energising means operable while said oscillator is oscillating and the other of said energising means operable while said oscillations are suppressed said other energising means including a thyratron connected between a source of alternating current and said motor means, said circuit means including a capacitor connected to the grid of said thyratron for accumulating a negative charge proportional to said oscillations and delaying the firing of said thyratron on at least alternate half cycles of said source while said oscillator is oscillating.

2. The combination claimed in claim 1 wherein said mass comprises a pivoted electrode, said movable electrode being pivoted on substantially the same axis as said pivoted electrode and juxtaposed thereto to cause electrostatic attraction therebetween while said oscillator is oscillating to move said elements toward each other thereby varying said capacitance and terminating said oscillations.

3. The combination claimed in claim 2 wherein said oscillator includes an electron discharge device, said one energising means including a connection between the cathode of said discharge device and said motor means, said thyratron and said discharge device having a common cathode circuit and being connected to said source to be supplied with alternating current in anti-phase.

4. The combination claimed in claim 1, wherein the capacitance between said electrode and said mass forms part of a high impedance radio frequency potential divider system in the circuit of said oscillator, the phase of the feed back voltage of the oscillator depending on the value of said capacitance.

References Cited in the file of this patent

UNITED STATES PATENTS

| | | |
|---|---|---|
| 1,809,683 | Fitzgerald | June 9, 1931 |
| 1,838,084 | Drake | Dec. 29, 1931 |
| 2,165,510 | Rosene | July 11, 1939 |
| 2,354,945 | Cohen et al. | Aug. 1, 1944 |
| 2,385,641 | Peterson | Sept. 25, 1945 |
| 2,458,731 | Rath | Jan. 11, 1949 |
| 2,527,797 | Cohen | Oct. 31, 1950 |
| 2,593,339 | Ostermann et al. | Apr. 15, 1952 |